US008965369B2

(12) United States Patent
Kim

(10) Patent No.: US 8,965,369 B2
(45) Date of Patent: Feb. 24, 2015

(54) METHOD AND APPARATUS FOR PROVIDING COMMUNICATION SERVICE IN SMALL-SIZED COMMUNICATION AREA

(75) Inventor: Soo-Hoi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 846 days.

(21) Appl. No.: 12/917,780

(22) Filed: Nov. 2, 2010

(65) Prior Publication Data

US 2011/0124328 A1 May 26, 2011

(30) Foreign Application Priority Data

Nov. 26, 2009 (KR) .................. 10-2009-0115225

(51) Int. Cl.
*H04W 48/18* (2009.01)
*H04W 4/16* (2009.01)
*H04W 36/30* (2009.01)
*H04W 80/04* (2009.01)
*H04W 8/26* (2009.01)
(Continued)

(52) U.S. Cl.
CPC . *H04W 4/16* (2013.01); *H04W 8/26* (2013.01); *H04W 84/045* (2013.01); *H04W 84/16* (2013.01)
USPC ......... 455/435.2; 455/417; 455/436; 370/331

(58) Field of Classification Search
USPC ........................................ 455/426
See application file for complete search history.

(56) References Cited

U.S. PATENT DOCUMENTS

| 7,865,186 B2 | 1/2011 | Kim et al. | |
| 8,219,100 B2* | 7/2012 | Bao et al. | 455/444 |
| 8,346,216 B2* | 1/2013 | Osborn | 455/411 |

(Continued)

FOREIGN PATENT DOCUMENTS

| CN | 1325238 A | 12/2001 |
| DE | 10034938 A1 | 1/2002 |

(Continued)

OTHER PUBLICATIONS

T-Mobile, Realization of open and "semi open" CSG cell, 3GPP Draft, S1-083177, 3rd Generation Partnership Project (3GPP), Mobile Competence Centre, Seoul, Oct. 20, 2008, XP050329910.
(Continued)

*Primary Examiner* — Vladimir Magloire
*Assistant Examiner* — Natasha Cosme
(74) *Attorney, Agent, or Firm* — Jefferson IP Law, LLP

(57) ABSTRACT

An apparatus and method for providing a communication service for a small-sized communication area in a communication system are provided. The method includes receiving a first wired network service data generation message including an identification number of a wired network service and a called number of wired network service data from a registered terminal, acquiring a femto access point and a wired network number mapped to the identification number of the wired network service from a pre-stored wired network service database, and setting the wired network number as a calling number of the registered terminal, and sending a first initial address message including the calling number and the called number to a wired communication network, wherein the wired network service represents a communication service that is provided from the wired communication network to at least one registered terminal and at least one non-registered terminal located in the small-sized communication area.

22 Claims, 11 Drawing Sheets

(51) Int. Cl.
*H04W 84/04* (2009.01)
*H04W 84/16* (2009.01)

(56) References Cited

U.S. PATENT DOCUMENTS

2001/0046859 A1 11/2001 Kil
2009/0131024 A1 5/2009 Osborn
2010/0311416 A1* 12/2010 Abichandani et al. ..... 455/426.1

FOREIGN PATENT DOCUMENTS

| JP | 2000-165315 A | 6/2000 |
|---|---|---|
| JP | 2004-248296 A | 9/2004 |
| JP | 2009-060188 A | 3/2009 |
| JP | 2010-200073 A | 9/2010 |
| WO | 2008/066830 A2 | 6/2008 |
| WO | 2009/029410 A1 | 3/2009 |

OTHER PUBLICATIONS

NEC, Considerations on Enterprise H(e)NB requirements, 3GPP Draft, S1-094145, 3rd Generation Partnership Project (3GPP), Mobile Competence Centre, Beijing, Nov. 16, 2009, XP050396113.

* cited by examiner

METHOD AND APPARATUS FOR PROVIDING COMMUNICATION SERVICE IN SMALL-SIZED COMMUNICATION AREA

PRIORITY

This application claims the benefit under 35 U.S.C. §119(a) of a Korean patent application filed in the Korean Industrial Property Office on Nov. 26, 2009, and assigned Serial No. 10-2009-0115225, the disclosure of which is hereby incorporated by reference.

BACKGROUND OF THE INVENTION

1. Field of the Invention

The present invention relates to a method and apparatus for providing a communication service in a small-sized communication area.

2. Description of the Related Art

With the development of communication services, the number of terminals registered with a mobile network (hereinafter referred to as "registered terminals") has rapidly increased. Typically, the user of such a registered terminal also has a separate terminal through which to use a wired network service within his/her home or office. In general, this separate terminal is not registered with a mobile network, so it will be hereinafter referred to as a "non-registered terminal". As a result, the user not only has a non-registered terminal for use in wired communication within a small-sized area, but also has a registered terminal for use in a mobile environment. Having both terminals causes a problem in that resources and costs are wasted to separately purchase and maintain both terminals according to their corresponding uses.

Further, users may establish a femto access point for providing a communication service to a small number of registered terminals located within a femto cell area that is a small-sized communication area, shaded area (i.e., having poor reception), such as an office, a residence, or a building, independent of a typical access point (hereinafter referred to as "macro access point"). That is, the femto access point not only can provide a communication service to a shaded area, but also reduces the load of the macro access point. Thus, the femto access point has an advantage in that it can increase the service capacity of a service provider without increasing the necessary capacity of the macro access point. However, there is currently no method by which to use a registered terminal with a non-registered terminal in a femto cell area.

Therefore, there is a need for a way to use a registered terminal with a non-registered terminal in the femto cell area.

SUMMARY OF THE INVENTION

An aspect of the present invention is to address at least the above-mentioned problems and/or disadvantages and to provide at least the advantages described below. Accordingly, an aspect of the present invention is to provide a method and apparatus for providing a communication service for a small-sized communication area in a communication system.

Further, another aspect of the present invention is to provide a method and apparatus for providing an existing wired network service to a registered terminal located in a femto cell area.

In accordance with an aspect of the present invention, a method for providing a communication service for a small-sized communication area in a communication system is provided. The method includes receiving a first wired network service data generation message including an identification number of a wired network service and a called number of wired network service data from a registered terminal, acquiring a femto access point and a wired network number mapped to the identification number of the wired network service from a pre-stored wired network service database, and setting the wired network number as a calling number of the registered terminal, and sending a first initial address message including the calling number and the called number to a wired communication network, wherein the wired network service represents a communication service that is provided from the wired communication network to at least one registered terminal and at least one non-registered terminal located in the small-sized communication area.

In accordance with another aspect of the present invention, a method for providing a communication service for a small-sized communication area in a communication system is provided. The method includes upon receiving an initial message including a called number of wired network service data, for which calling is requested, from a registered terminal through a wired communication network, acquiring location information of a called party that uses the called number, determining from a pre-stored wired network service database if the location information of the called party indicates a femto cell subscribing to a wired network service provided through the wired communication network, when the location information of the called party indicates the femto cell subscribing to the wired network service, acquiring wired network service members mapped to an identifier of the femto cell from the wired network service database, and determining locations of the wired network service members, when a result of the determination shows that the wired network service members are located in the femto cell indicated by the location information of the called party registered terminal, simultaneously sending a ring signal informing the wired network service members of transmission of the wired network service data, for which calling is requested, to the wired network service members, and upon receiving a response message from a first wired network service member among the wired network service members, stopping the sending of the ring signal to the wired network service members other than the first wired network service member, wherein the wired network service represents a communication service that is provided from the wired communication network to at least one registered terminal and at least one non-registered terminal located in the small-sized communication area.

In accordance with yet another aspect of the present invention, an apparatus for providing a communication service for a small-sized communication area in a communication system is provided. The apparatus includes a receiver for receiving a first wired network service data generation message including an identification number of a wired network service and a called number of wired network service data from a registered terminal, a controller for acquiring a femto access point and a wired network number mapped to the identification number of the wired network service from a pre-stored wired network service database, and for setting the wired network number as a calling number of the registered terminal, and a transmitter for sending a first initial address message including the calling number and the called number to a wired communication network, wherein the wired network service represents a communication service that is provided from the wired communication network to at least one registered terminal and at least one non-registered terminal located in the small-sized communication area.

In accordance with still yet another aspect of the present invention, an apparatus for providing a communication service for a small-sized communication area in a communication system is provided. The apparatus includes a receiver for receiving an initial message including a called number of wired network service data, for which calling is requested, from a registered terminal through a wired communication network, and a controller for acquiring location information of a called party that uses the called number, determining from a pre-stored wired network service database if the location information of the called party indicates a femto cell subscribing to a wired network service provided through the wired communication network, for acquiring wired network service members mapped to an identifier of the femto cell from the wired network service database when the location information of the called party indicates the femto cell subscribing to the wired network service, for determining locations of the wired network service members, for controlling a transmitter to simultaneously send a ring signal informing the wired network service members of transmission of the wired network service data, for which calling is requested, to the wired network service members when a result of the determination shows that the wired network service members are located in the femto cell indicated by the location information of the called party registered terminal, and for stopping the sending of the ring signal to the wired network service members other than a first wired network service member when the receiver receives a response message from the first wired network service member among the wired network service members, wherein the wired network service represents a communication service that is provided from the wired communication network to at least one registered terminal and at least one non-registered terminal located in the small-sized communication area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention proposes a method and apparatus for providing a wired network service, in which non-registered terminals located within a specific small-sized communication area use in the specific small-sized communication area, to a registered terminal when the registered terminal is located within the specific small-sized communication area in a communication system including femto cells, each of which has a small-sized communication area as a service coverage area.

Figure 1:
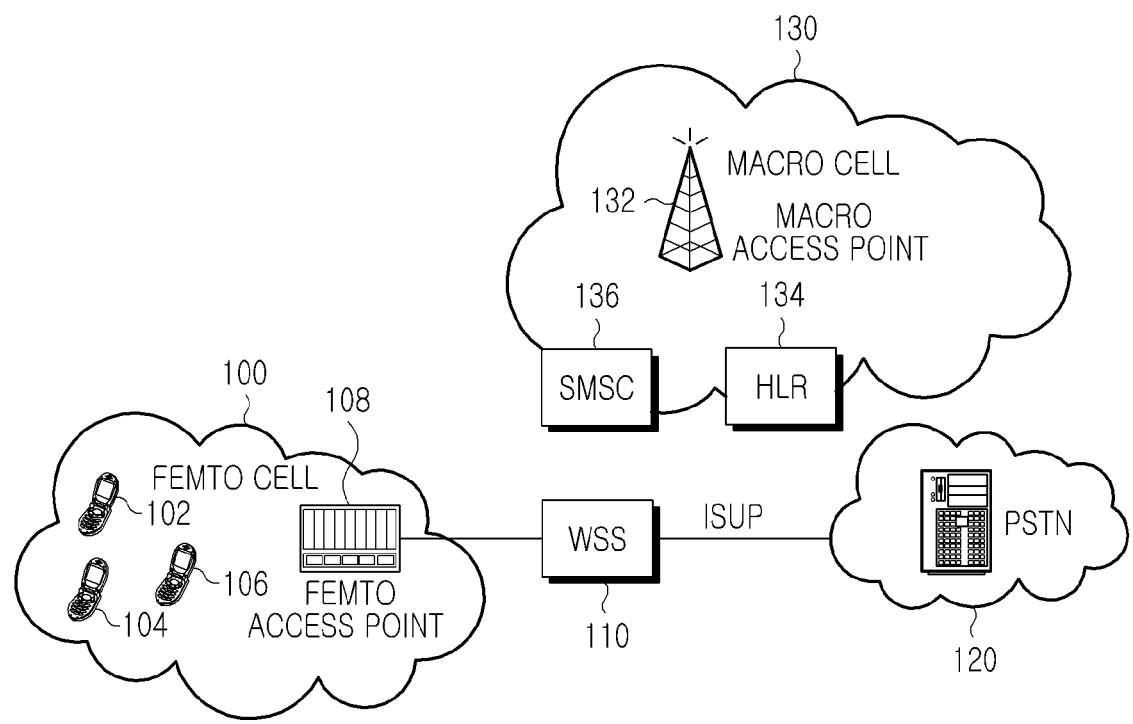
FIG. 1 is a view illustrating a system for providing a wired network service in accordance with an exemplary embodiment of the present invention.

FIG. 1 is a view illustrating a system for providing a wired network service according to an exemplary embodiment of the present invention.

Referring to FIG. 1, the communication system includes a femto cell 100, a Wired Soft Switch (WSS) 110, a Public Switched Telephone Network (PSTN) 120, and a macro cell 130.

A femto access point 108, acting as the serving access point of the femto cell 100, provides a communication service to registered terminals 102, 104 and 106 located within the femto cell 100. That is, the femto access point 108 provides the registered terminals 102 to 106 with not only a mobile communication service, but also a wired network service that is provided to non-registered terminals located within the femto cell through the PSTN.

The WSS 110 manages information related to a wired network service in a corresponding small-sized communication area served by each of multiple femto access points. More specially, the WSS 110 has a wired network DataBase (wired network service DB) for storing information indicating whether or not each of the multiple femto access points under the control thereof subscribes to a wired communication service and for storing information related to the corresponding wired network service. Furthermore, the WSS 110 manages the wired network service DB.

The wired network service DB also stores information regarding whether each of the femto access points under the control of the WSS 110 subscribes to a wired network service, the femto cell identifier of each femto cell subscribing to the corresponding wired network service, the identifier of a wired network service provided by a femto access point corresponding to the femto cell identifier, a wired network number mapped to the identifier of the wired network service, and wired network service members mapped to the wired network number. The wired network number denotes a number that is used as a called/calling number when data of the corresponding wired network service is sent/received. The wired network service members represent users who subscribe to the corresponding wired network service and thus can use the corresponding wired network service when located within a femto cell area to which the corresponding wired network service is mapped. The wired network service members include registered terminals located within the femto cell area. The wired network service members also include non-registered terminals fixedly located within the femto cell area. However, the non-registered terminals included as wired network service members do not use a wired network service through a femto access point, but directly use a wired network service provided through the PSTN 120. That is, the non-registered terminals are operated in the same manner as a typical wired/wireless telephone for use in a home or office. As an example, only the registered terminals 102 to 106 located within the femto cell 100 correspond to wired network service members receiving a wired network service provided by the femto access point 108. The registered terminals 102 to 106 are used as the wired network service members when located within the femto cell 100, but can use their typical mobile communication functions regardless of whether or not they are located within the femto cell 100. That is, each of the registered terminals 102 to 106 can receive a mobile communication service provided from a mobile communication network, such as the macro cell 130, by using a number for mobile communication when located in the service coverage of the corresponding mobile communication network. Further, the WSS 110 distinguishes between a case in which a call for wired network service data provided to the registered terminals 102 to 106 through the femto access point 108 is requested and a case in which a call for mobile communication service data is requested, and may set different ring signals indicating the corresponding cases. Thus, when the registered terminals 102 to 106 are located within the femto cell 100, they can recognize whether corresponding data is wired network service data provided through the femto access point 108 or mobile communication service data, based on a received ring signal.

If the WSS 110 determines that the registered terminals 102 to 106 are located within the femto cell 100 subscribing to a wired network service provided through the femto access point 108, then it stores the registered terminals 102 to 106 as wired network service members of the femto access point 108 in the wired network service DB, and maps the wired network service members to a wired network number mapped to the wired network service provided through the femto access point 108. Further, the WSS 110 registers location information of the registered terminals 102 to 106, that is, the wired network number, the identifier of the femto cell 100, and the identifier of the femto cell access point 108, in a Home Location Register (HLR) 134. Here, the HLR 134 is operated in the same manner as a typical HLR for storing location information of terminals registered with a mobile network. One difference between them is that the HLR in the present invention manages a wired network number of a corresponding registered terminal in addition to location information thereof when the corresponding registered terminal has the wired network number.

Further, the WSS 110 maps non-registered terminals using a wired network number, that is, non-registered terminals fixedly located within the femto cell 100, to the wired network number, and stores the identifier of the femto cell 100 as location information of the non-registered terminals in a Visitor Location Register (VLR) provided therein. Further, when the non-registered terminals depart from the femto cell 100, the WSS 110 deletes the location information of the non-registered terminals stored in the VLR. The PSTN 120 represents a typical wired network for providing a wired network service, and basically provides a wired communication service to subscribers. Further, the PSTN 120 provides the wired communication service to wired network members of the femto access point 108, for example, the registered terminals 102 to 106 located within the femto cell 100, through the femto access point 108, or directly provides the wired communication service to non-registered terminals not shown in the drawing not via the femto access point 108. The WSS 110 and the PSTN 120 use an Integrated Services digital network User Part (ISUP) protocol that is used to provide signal capabilities required for a wired network charging service and a typical switching system.

The macro cell 130 is a typical mobile network for providing a mobile communication service, and provides the mobile communication service to the registered terminals 102 to 106 when they are located within its service coverage area. The macro cell 130 includes the HLR 134 for managing locations of registered terminals and an SMS Service Center (SMSC) 136 for providing a Short Message Service (SMS) to registered terminals accessing a macro access point 132.

In general, the SMSC 136 generates SMS messages to be provided to registered terminals located within the macro cell 130 and at the same time generates SMS messages to be provided to wired network service members subscribing to a wired network service provided through the femto access point 108 of the femto cell 100 according to a request received through the WSS 110, and provides the generated SMS messages to the WSS 110.

Hereinafter, a procedure of providing a wired network service according to an exemplary embodiment of the present invention will be described with reference to FIGS. 2A to 7. The procedure of providing a wired network service is largely divided into a procedure of registering a wired network number and wired network service members of a wired network service provided by a corresponding femto access point and a procedure in which wired network service data, such as a call and SMS data, is received/sent. These procedures will be described separately for registered terminals and non-registered terminals located within a femto cell.

Figure 2A:
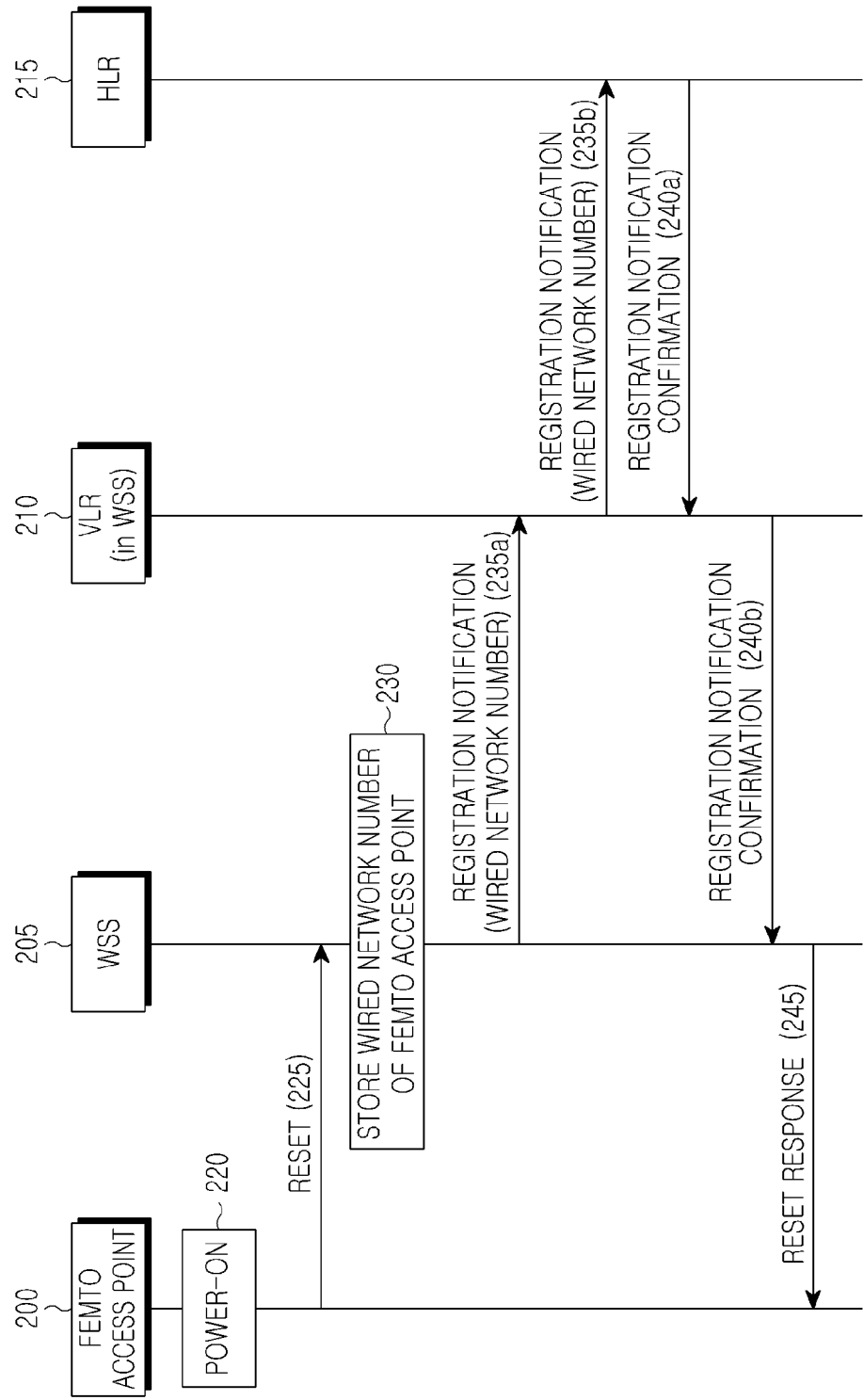
FIG. 2A is a flow diagram illustrating a procedure of registering a wired network numbers of registered terminals located within a femto cell in accordance with an exemplary embodiment of the present invention.

FIG. 2A is a flow diagram illustrating a procedure of registering a wired network number provided through a femto access point according to an exemplary embodiment of the present invention.

Referring to FIG. 2A, the communication system includes a femto access point 200, a WSS 205, a VLR 210 provided in the WSS 205, and an HLR 215. If the femto access point 200 is powered on by a service provider or the like in step 220, then the femto access point 200 is reset and sends a reset message indicating its resetting to the WSS 205 in step 225.

Upon receiving the reset message, in step 230, the WSS 205 acquires the wired network number mapped to the femto access point 200 from a wired network service DB in which wired network numbers of respective femto access points under the control of the WSS 205 are mapped to wired network service members, and stores the acquired wired network number as the wired network number of a wired network service provided by the femto access point 200 in its VLR 210. Subsequently, the WSS 205 sends a registration notification message, which notifies the HLR 215 of the wired network number of the wired network service provided by the femto access point 200, to the HLR 215 via the VLR 210 through steps 235a and 235b.

Upon receiving the registration notification message, in steps 240a and 240b, the HLR 215 sends a registration notification confirmation message, which indicates that the wired network number of the femto access point 200 has been registered therein, to the WSS 205 via the VLR 210. The WSS 205 delivers a reset response message indicating the completion of the resetting to the femto access point 200 in step 245.

Figure 2B:
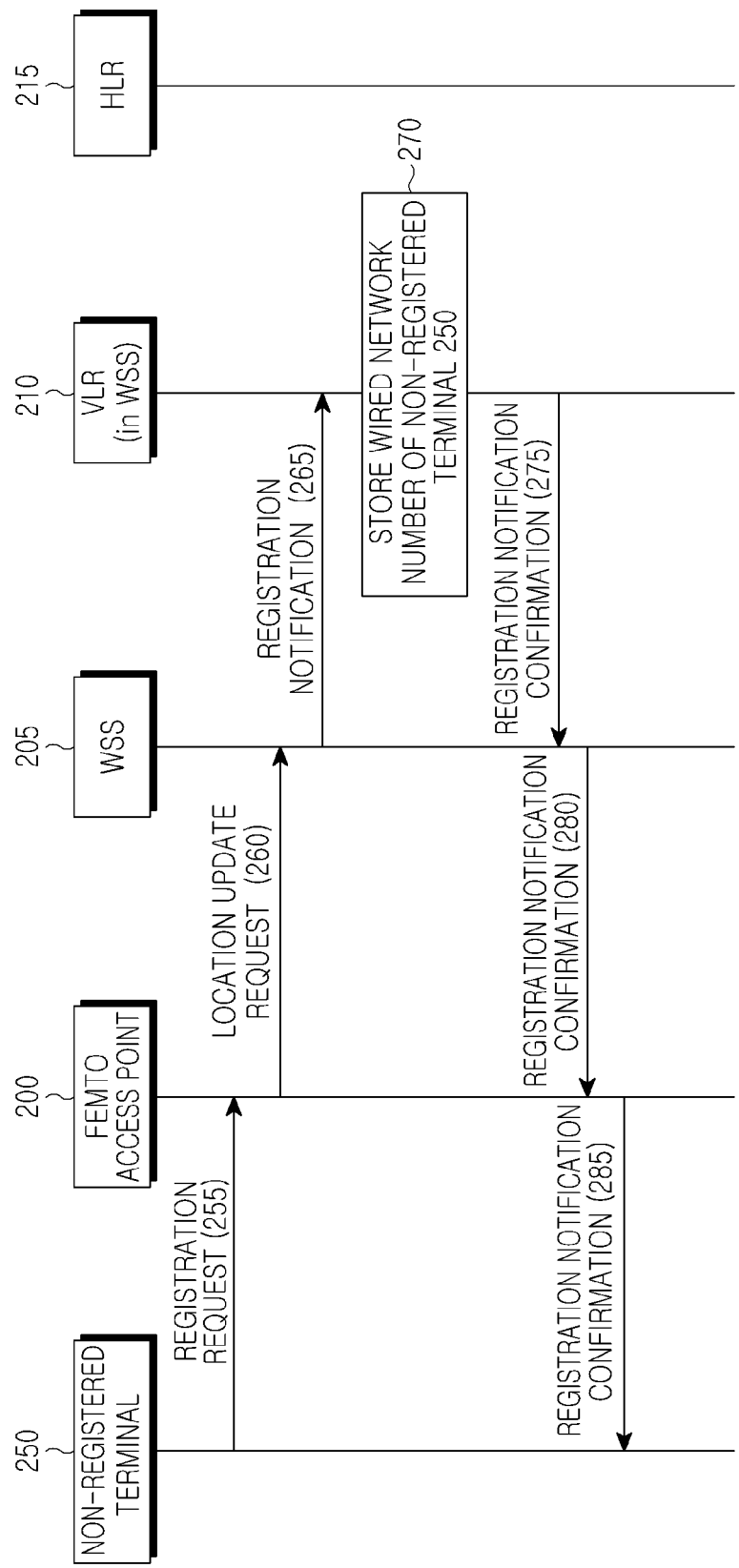
FIG. 2B is a flow diagram illustrating a procedure of registering non-registered terminals fixedly located within a femto cell as wired network service members of the femto cell in accordance with an exemplary embodiment of the present invention.

FIG. 2B is a flow diagram illustrating a procedure of registering non-registered terminals fixedly located within a femto cell as wired network service members of the femto cell according to an exemplary embodiment of the present invention.

Referring to FIG. 2B, the communication system includes a non-registered terminal 250, the femto access point 200, the WSS 205, the VLR 210 provided in the WSS 205, and the HLR 215. The non-registered terminal 250 is in a state where it is fixedly located in the femto cell area of the femto access point 200, and sends a registration request message, which requests the femto access point 200 to register the non-registered terminal 250 as a wired network service member for using a wired network service provided by the femto access point 200, to the femto access point 200 in step 255.

In step 260, the femto access point 200 sends a location update message, which indicates that the non-registered terminal 250 is located within the femto cell, to the WSS 205. In step 265, the WSS 205 acquires a wired network number mapped to the femto access point 200 from the wired network service DB, and sends a registration notification message, which includes the wired network number and the identifier of the femto cell where the femto access point 200 is located, to the VLR 210. The VLR 210 stores the femto cell identifier and the wired network number as location information of the non-registered terminal 250 in step 270, and sends a registration notification confirmation message, which indicates that the wired network number has been stored therein, to the WSS 205 in step 275. In the same manner, the WSS 205 sends a registration notification confirmation message, which indicates that the wired network number has been stored as the wired network number of the non-registered terminal 250 in the VLR 210, to the non-registered terminal 250 via the femto access point 200 in steps 280 and 285.

Figure 3A:
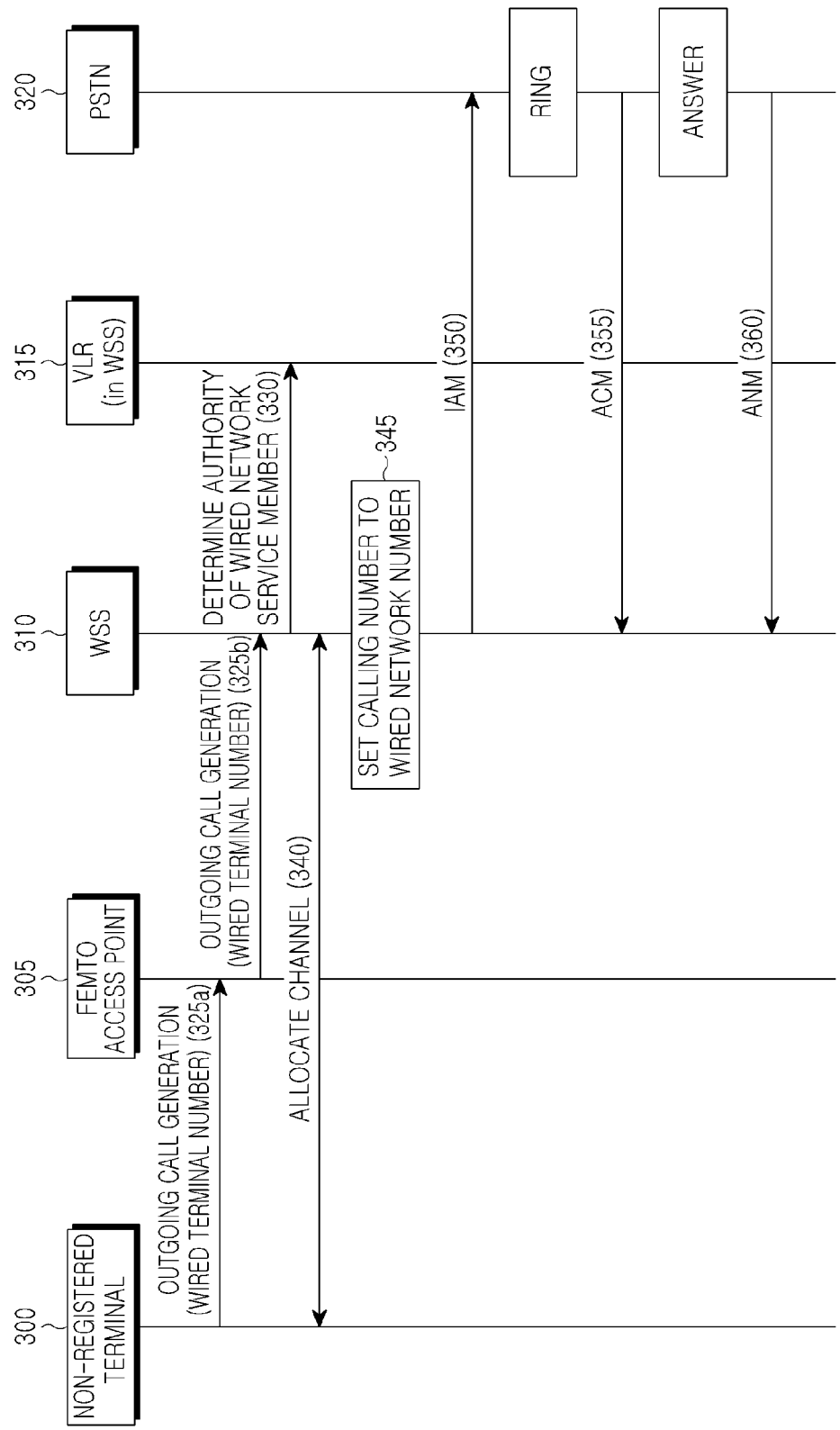
FIG. 3A is a flow diagram illustrating an operation of sending an outgoing call in a wired network service for a non-registered terminal in accordance with an exemplary embodiment of the present invention.

FIG. 3A is a flow diagram illustrating an operation of sending an outgoing call in a wired network service for a non-registered terminal according to an exemplary embodiment of the present invention.

Referring to FIG. 3A, the communication system includes a non-registered terminal 300, a femto access point 305, a WSS 310, a VLR 315, and a PSTN 320. Also, the non-registered terminal 300 is located within a femto cell area served by the femto access point 305, and is in a state in which its location information has been already registered in the VLR 315 of the WSS 310 through the procedure of FIG. 2B. If an outgoing call which is to be sent by the non-registered terminal 300 is generated, then the non-registered terminal 300 sends an outgoing call generation message indicating the generation of the outgoing call to the WSS 315 via the femto access point 305 in steps 325a and 325b. Here, the outgoing call generation message includes the number of the non-registered terminal 300.

In step 330, the WSS 310 determines the wired network service member authority of the non-registered terminal 300. That is, the WSS 310 acquires location information of the non-registered terminal 300 from the VLR 315, and determines if the femto access point 305 located in the femto cell area corresponding to the femto cell identifier of the non-registered terminal 300, included in the location information, subscribes to a wired network service. When, as a result of the determination, the femto access point 305 subscribes to the wired network service, the WSS 310 allocates a channel for the outgoing call to the non-registered terminal 300 in step 340, and proceeds to step 345. In step 345, the WSS 310 sets the calling number for the outgoing call of the non-registered terminal 300 to a wired network number mapped to the femto access point 305, which is acquired from the wired network service DB, instead of the identity number of the non-registered terminal 300, and sends an Initial Address Message (IAM) including the wired network number to the PSTN 320 in step 350. The IAM is a message for initiating a call setup to a called party terminal, and includes the calling number of the non-registered terminal 300, which is set to the wired network number, and the number of the called party terminal, which is the destination of the outgoing call.

In step 355, the PSTN 320 sends a ring, that is, a signal informing the called party terminal of the outgoing call, to the number of the called party terminal, and sends an Address Complete Message (ACM), which indicates that address information necessary for the call setup to the called party terminal has been received, to the WSS 310. Subsequently, upon receiving a response to the ring from the called party terminal, the PSTN 320 sends an ANswer Message (ANM), which indicates that the response to the ring has been received, to the WSS 310 in step 360.

Figure 3B:
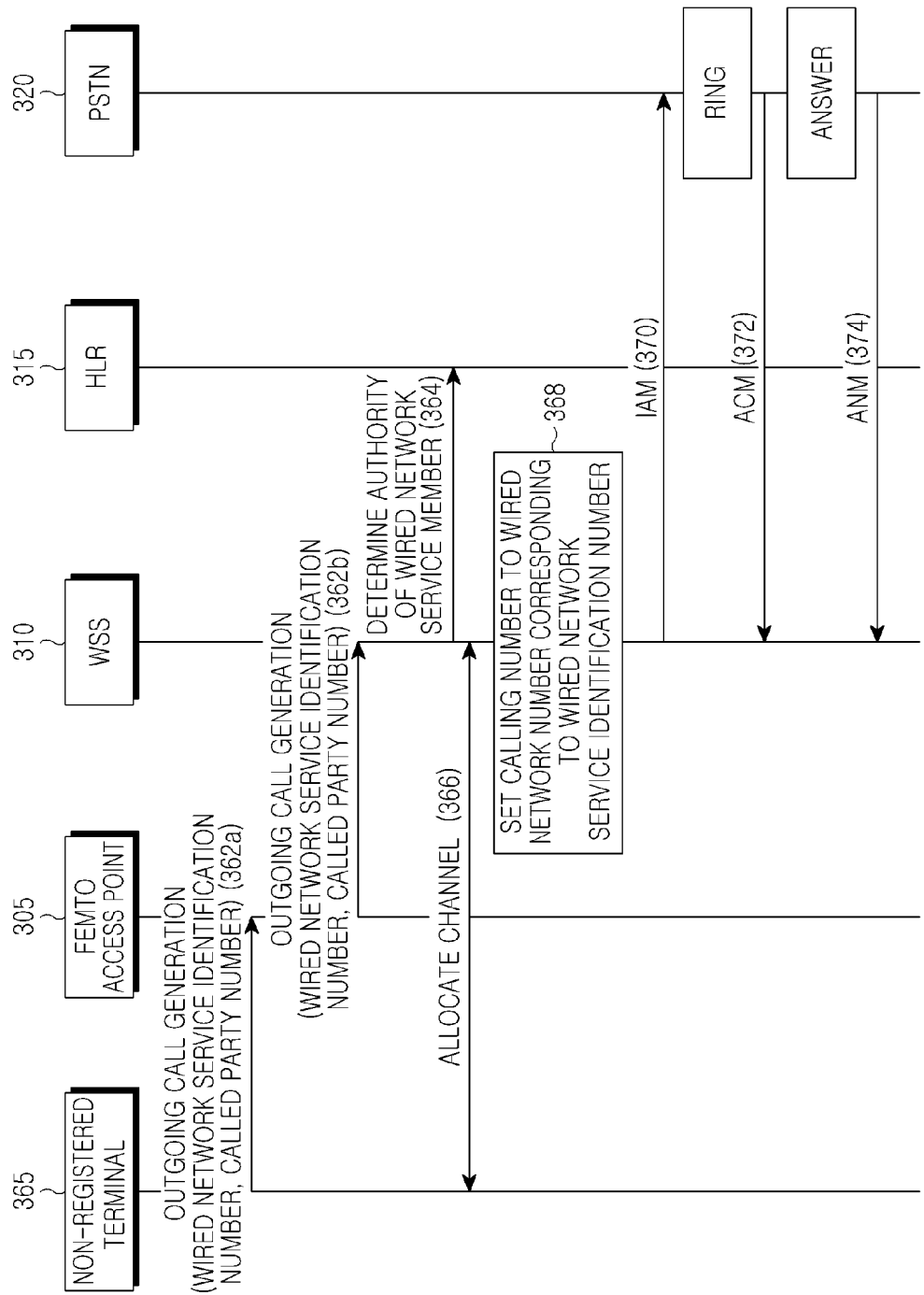
FIG. 3B is a flow diagram illustrating an operation of sending an outgoing call in a wired network service for a registered terminal in accordance with an exemplary embodiment of the present invention.

FIG. 3B is a flow diagram illustrating an operation of sending an outgoing call in a wired network service for a registered terminal according to an exemplary embodiment of the present invention.

Referring to FIG. 3B, the communication system includes a registered terminal 365, the femto access point 305, the WSS 310, the VLR 315, and the PSTN 320. Here, it is assumed that the registered terminal 365 is located within the femto cell area of the femto access point 305 and thus can simultaneously use both a mobile communication service and a wired network service, and the femto access point 305 has subscribed to the wired network service. If an outgoing call is generated by the registered terminal 365, then the registered terminal 365 sends an outgoing call generation message indicating the generation of the outgoing call to the WSS 315 via the femto access point 305 in steps 362a and 362b. Here, the outgoing call generation message includes a wired network service identification number, to which the registered terminal 365 subscribes, and a called party number that is the destination of the outgoing call.

In step 364, the WSS 310 determines the wired network service member authority of the registered terminal 365. That is, the WSS 310 acquires a wired network number mapped to the wired network service identification number from the wired network service DB, and determines if the identifier of a femto cell or a femto access point, to which the wired network number is mapped, exists in the HLR 315. When, as a result of the determination, the identifier of such a femto cell or femto access point 305 exists in the HLR 315, the WSS 310 stores the identifier of the corresponding femto access point 305, and proceeds to step 366. In step 366, the WSS 310 allocates a channel for the outgoing call to the registered terminal 365 through the femto access point 305, and proceeds to step 368. The WSS 310 sets the calling number of the registered terminal 365 to the acquired wired network number in step 368, and sends an IAM including the wired network number to the PSTN 320 in step 370. The IAM includes the calling number of the registered terminal 365, which is set to the wired network number, and the called party number. The called party number is also set to the wired network number.

In step 372, the PSTN 320 sends a ring, that is, a signal informing the called party terminal of the outgoing call, to the called party number, and sends an ACM to the WSS 310. Subsequently, upon receiving a response to the ring from the called party terminal, the PSTN 320 sends an ANM, which indicates that the response to the ring has been received, to the WSS 310 in step 374.

Figure 4:
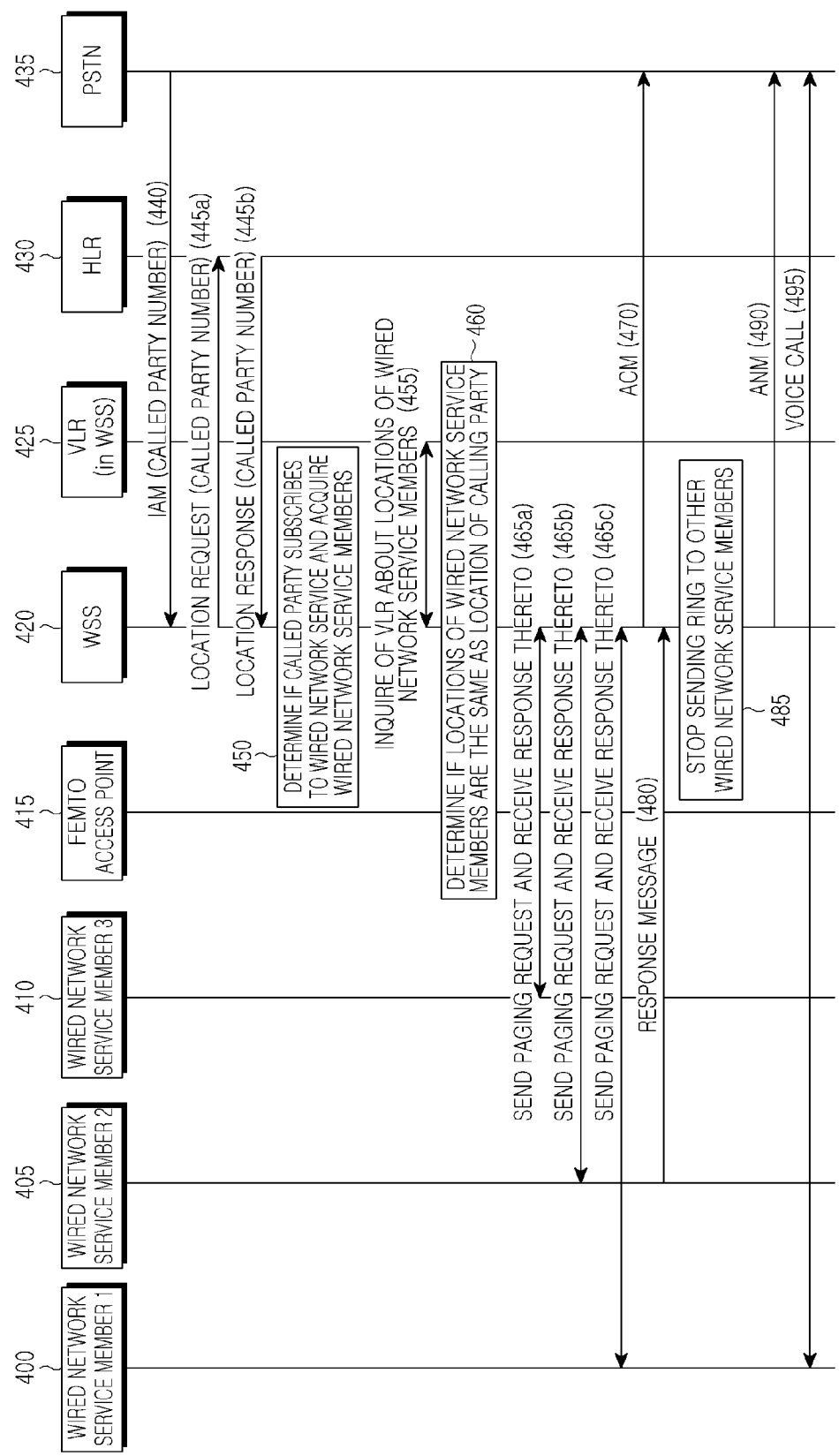
FIG. 4 is a flow diagram illustrating an operation in which a call is incoming to a wired network service member in a wired network service in accordance with an exemplary embodiment of the present invention.

FIG. 4 is a flow diagram illustrating an operation in which a call is incoming to a wired network service member in a wired network service according to an exemplary embodiment of the present invention.

Referring to FIG. 4, the communication system includes wired network service member 1 400, wired network service member 2 405, wired network service member 3 410, a femto access point 415, a WSS 420, a VLR 425, an HLR 430, and a PSTN 435. The femto access point 415 provides a wired network service provided by the PSTN 435 to mobile terminals located within its service coverage area, that is, the femto cell area, as well as wired network service members 1 to 3 400 to 410 subscribing to the wired network service that are located within the femto cell area of the femto access point 415.

In step 440, the PSTN sends an IAM including a called party number for an outgoing call requested by a calling party to the WSS 420. In the following description, it will be assumed that the calling party sending the outgoing call uses a registered terminal.

In step 445a, the WSS 420 sends a location request message for the called party, which includes the called party number, to the HLR 430. When location information of a registered terminal to which the called party number is mapped, that is, a femto access point serving a femto cell area where the registered terminal is located, exists in the HLR 430, the HLR 430 sends a location response message including the identifier of the femto access point to the WSS 420 in step 445b.

In step 450, the WSS 420 determines from the wired network service DB if the identifier of the femto access point subscribes to the wired network service. When it is determined that the identifier of the femto access point subscribes to the wired network service, the WSS 420 determines wired network service members mapped to the identifier of the femto access point, and proceeds to step 455. In step 455, the WSS 420 inquires of the VLR 425 about locations of wired network service members that are stored in the VLR 425 among the wired network service members, that is, non-registered terminals. In step 460, the WSS 420 determines if, as a result of the inquiry about the locations, the wired network service members are located within the femto cell area where the calling party is located. When, as a result of the determination, the wired network service members are located within the femto cell area where the calling party is located, the WSS 420 proceeds to steps 465a to 465c. In steps 465a to 465c, the WSS 420 sends a paging request message to each of the wired network service members determined in step 450, that is, wired network service member 1 400, wired network service member 2 405, and wired network member 3 410, and receives a response message to the paging request message from each of the wired network members. Here, it is assumed that wired network service members 1 to 3 400 to 410 are in an idle state.

Subsequently, in step 470, the WSS 420 sends an ACM, which indicates that the paging response messages have been received, to the PSTN 435. In step 475, the WSS 420 allocates a channel for the outgoing call to each of wired network service members 1 to 3 400 to 410, and sends a signal indicative of the outgoing signal, that is, a ring, to each of wired network service members 1 to 3 400 to 410. In step 480, the WSS 420 receives a response message to the ring from, for example, wired network service member 2 405. In step 485, the WSS 420 stops sending the ring to wired network service members 1 and 3 400, 410 from which response messages to the ring are not received. Further, in step 490, the WSS 420 sends an ANM, which indicates that the response message to the ring has been received from wired network service member 2 405, to the PSTN 435. By completing the above procedure, wired network service member 2 405 performs voice communication with the calling party, which has sent the outgoing call, through the PSTN 435 in step 495.

Assuming that the calling party in communication with wired network service member 2 405 is a registered terminal, the call with wired network service member 2 405 is released when the registered terminal departs from the femto cell area of the calling party.

Figure 5A:
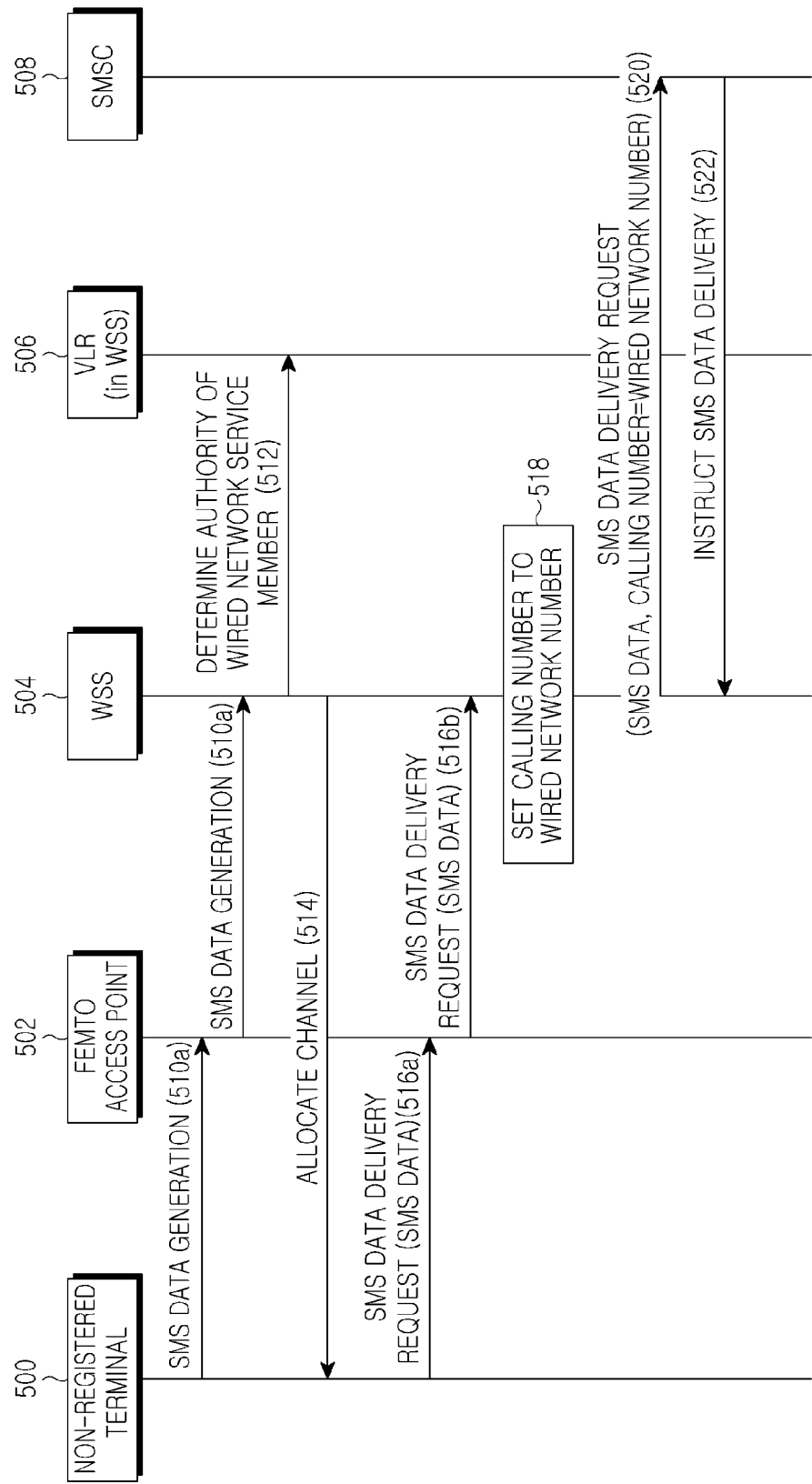
FIG. 5A is a flow diagram illustrating an operation of sending Short Message Service (SMS) data in a wired network service for a non-registered terminal in accordance with an exemplary embodiment of the present invention.

FIG. 5A is a flow diagram illustrating an operation of sending SMS data in a wired network service for a non-registered terminal according to an exemplary embodiment of the present invention.

Referring to FIG. 5A, the communication system includes a non-registered terminal 500, a femto access point 502, a WSS 504, a VLR 506, and an SMSC 508. If outgoing SMS data which is to be sent from the non-registered terminal 500 to a called party is generated, the non-registered terminal 500 sends an SMS data generation message to the WSS 504 via the femto access point 502 in steps 510a and 510b. Upon receiving the SMS data generation message, the WSS 504 determines the authority of the non-registered terminal 500 in step 512. That is, the WSS 504 acquires location information of the non-registered terminal 500 from the VLR 506, and determines if the femto access point 502 corresponding to the femto access point identifier of the non-registered terminal 500, included in the location information, subscribes to a wired network service. When, as a result of the determination, the femto access point 502 subscribes to the wired network service, the WSS 504 allocates a channel for the outgoing SMS data to the non-registered terminal 500 in step 514.

Subsequently, in steps 516*a* and 516*b*, the non-registered terminal 500 sends an SMS data delivery request message including the outgoing SMS data to the WSS 504 over the allocated channel via the femto access point 502. The WSS 504 sets the calling number of the SMS data to a wired network number mapped to the femto access point 502, which is acquired from the wired network service DB, in step 518, and proceeds to step 520. In step 520, the WSS 504 sends an SMS data delivery request message, which includes the SMS data and the wired network number set as the calling number of the SMS data, to the SMSC 508. The SMSC 508 sends an SMS data delivery instruction message including the SMS data to the WSS 504 in step 522.

Figure 5B:
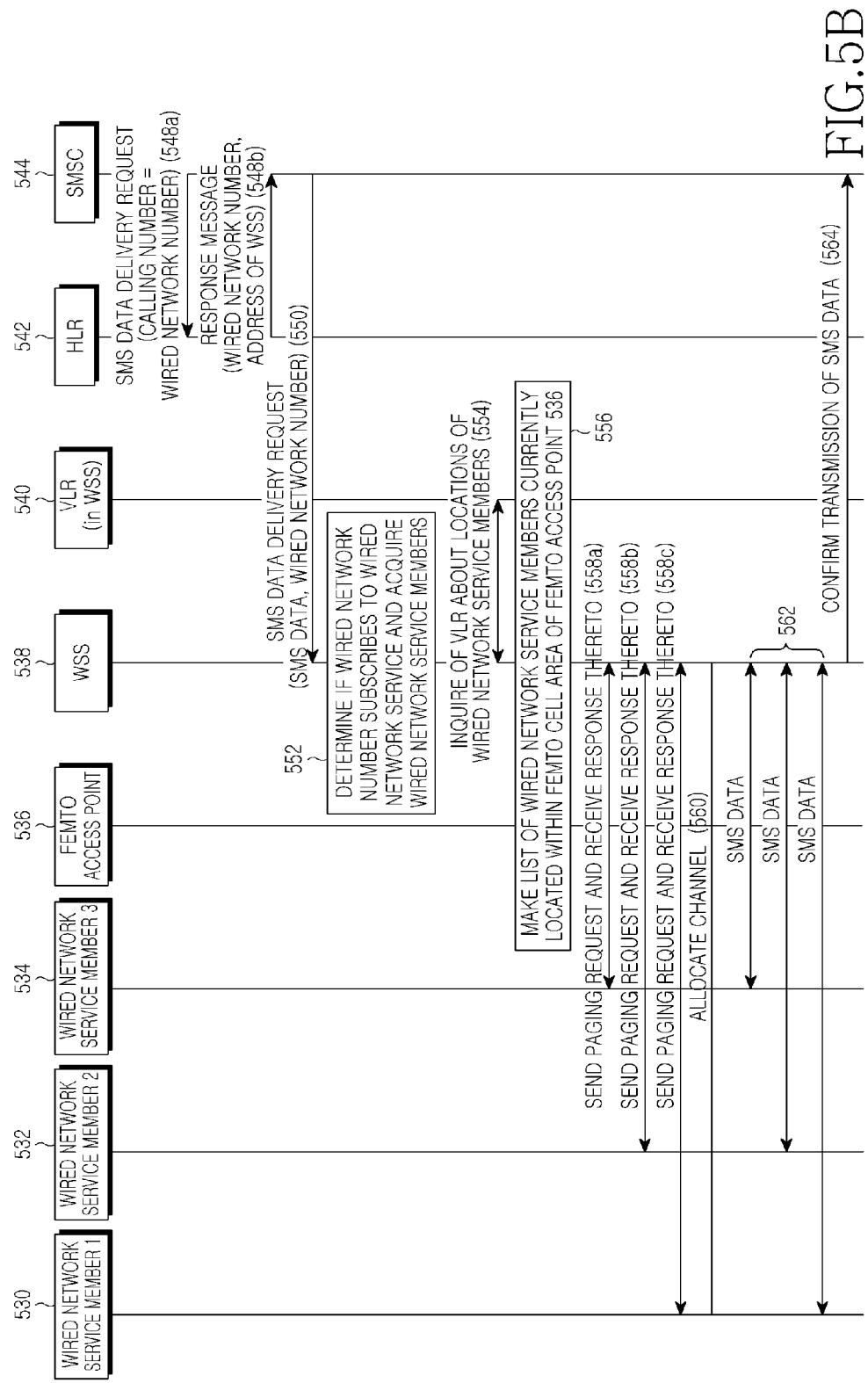
FIG. 5B is a flow diagram illustrating an operation in which SMS data sent to a wired network number is incoming to the wired network number in accordance with an exemplary embodiment of the present invention.

FIG. 5B is a flow diagram illustrating an operation in which SMS data sent to a wired network number is incoming to the wired network number according to an exemplary embodiment of the present invention.

Referring to FIG. 5B, the communication system includes wired network service member 1 530, wired network service member 2 532, wired network service member 3 534, a femto access point 536, a WSS 538, a VLR 540, an HLR 542, and an SMSC 544. Each of wired network service members 1 to 3 530 to 534 is located within the femto cell area of the femto access point 536, and has subscribed to a wired network service. Furthermore, it is assumed that the SMSC 544 is in the state after the procedure of FIG. 5A is completed, and thus SMS data sent from the calling party of the SMS data and the wired network number of the calling party are stored in the SMSC 544.

In step 548*a*, the SMSC 544 sends an SMS data delivery request message including the wired network number of the calling party to the HLR 542. The HLR 542 sends a response message to the SMS data delivery request message to the SMSC 544 in step 548*b*, and proceeds to step 550. The response message includes the wired network number and the address of the WSS 538 managing the wired network number.

Upon acquiring the address of the WSS 538, the SMSC 544 sends an SMS data delivery request message including the SMS data and the wired network number to the WSS 538 in step 550. In step 552, the WSS 538 determines if the wired network number exists in the wired network service DB, determines wired network service members mapped to the wired network number when the wired network number exists in the wired network service DB, and proceeds to step 554. In step 554, the WSS 538 inquires of the VLR 540 about locations of the wired network service members. In step 556, the WSS 538 makes a list of wired network service members that are currently located within the service coverage area of the femto cell served by the femto access point 536 among the wired network service members, based on a result of the inquiry about the locations. By way of example, it is assumed that wired network service members 1 to 3 530 to 534 are listed.

Subsequently, in steps 558*a* to 558*c*, the WSS 538 sends a paging request message to each of the listed wired network service members, that is, wired network service members 1 to 3 530 to 534, and receives a response message thereto from each of wired network service members 1 to 3 530 to 534. Also, the WSS 538 allocates a channel for the SMS data to each of wired network service members 1 to 3 530 to 534 in step 560, and sends the SMS data to each of wired network service members 1 to 3 530 to 534 in step 562. In step 564, the WSS 538 sends an SMS data transmission confirmation message indicating the completion of transmission of the SMS data to the SMSC 544.

Figure 6A:
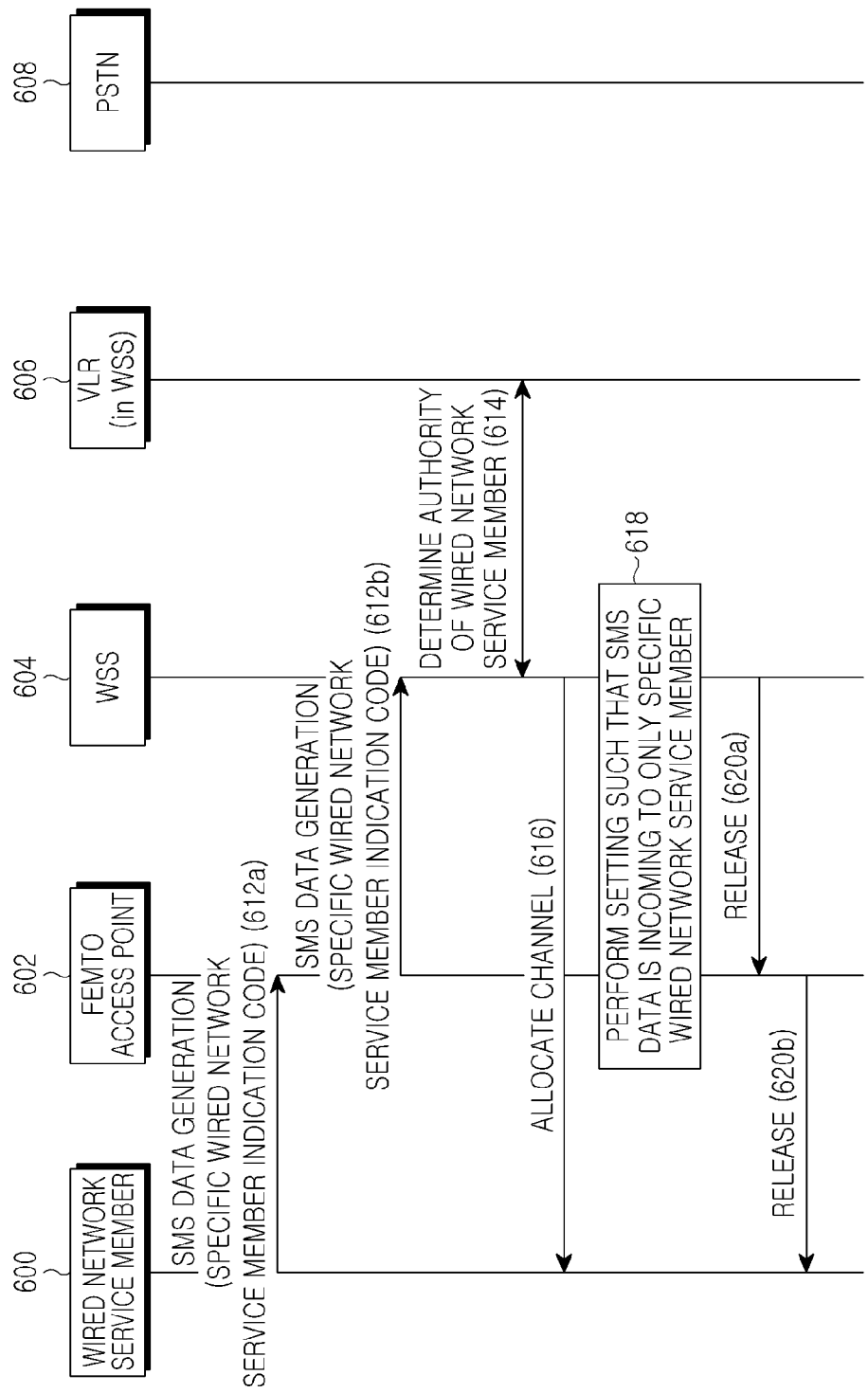
FIG. 6A is a flow diagram illustrating an operation for permitting SMS data incoming to a specific wired network service member in accordance with an exemplary embodiment of the present invention.

FIG. 6A is a flow diagram illustrating an operation for permitting SMS data incoming to a specific wired network service member according to an exemplary embodiment of the present invention.

Referring to FIG. 6A, the communication system includes a wired network service member 600, a femto access point 602, a WSS 604, a VLR 606, and a PSTN 608. If outgoing SMS data which is to be sent by the wired network service member 600 is generated, then the wired network service member 600 sends an SMS data generation message to the WSS 604 via the femto access point 602 in steps 612*a* and 612*b*. In this regard, the SMS data generation message includes at least one code indicating another wired network service member subscribing to the wired network service of the wired network service member 600.

Upon receiving the SMS data generation message, the WSS 604 determines the authority of the wired network service member 600 in step 614. That is, the WSS 604 determines if location information of the wired network service member indicated by the code exists in the VLR 606. As a result of the determination, the WSS 603 acquires the location information of wired network service member, that is, the identifier of a femto cell where the wired network service member is located, and determines if the femto cell where the wired network service member is located is the same as the femto cell of the wired network service member 600. When, as a result of the determination, the two femto cells are the same, the WSS 604 allocates a channel for the SMS data in step 616, and proceeds to step 618. In step 618, the WSS 604 performs setting such that the SMS data is incoming to only a wired network service member indicated by at least one code included in the SMS data generation message among wired network service members subscribing to the wired network service of the wired network service member 600. In steps 620*a* and 620*b*, the WSS 604 sends a confirmation message, which indicates that setting is done such that the SMS data is incoming to only the wired network service member indicated by the at least one code, to the wired network service member 600 via the femto access point 602.

Figure 6B:
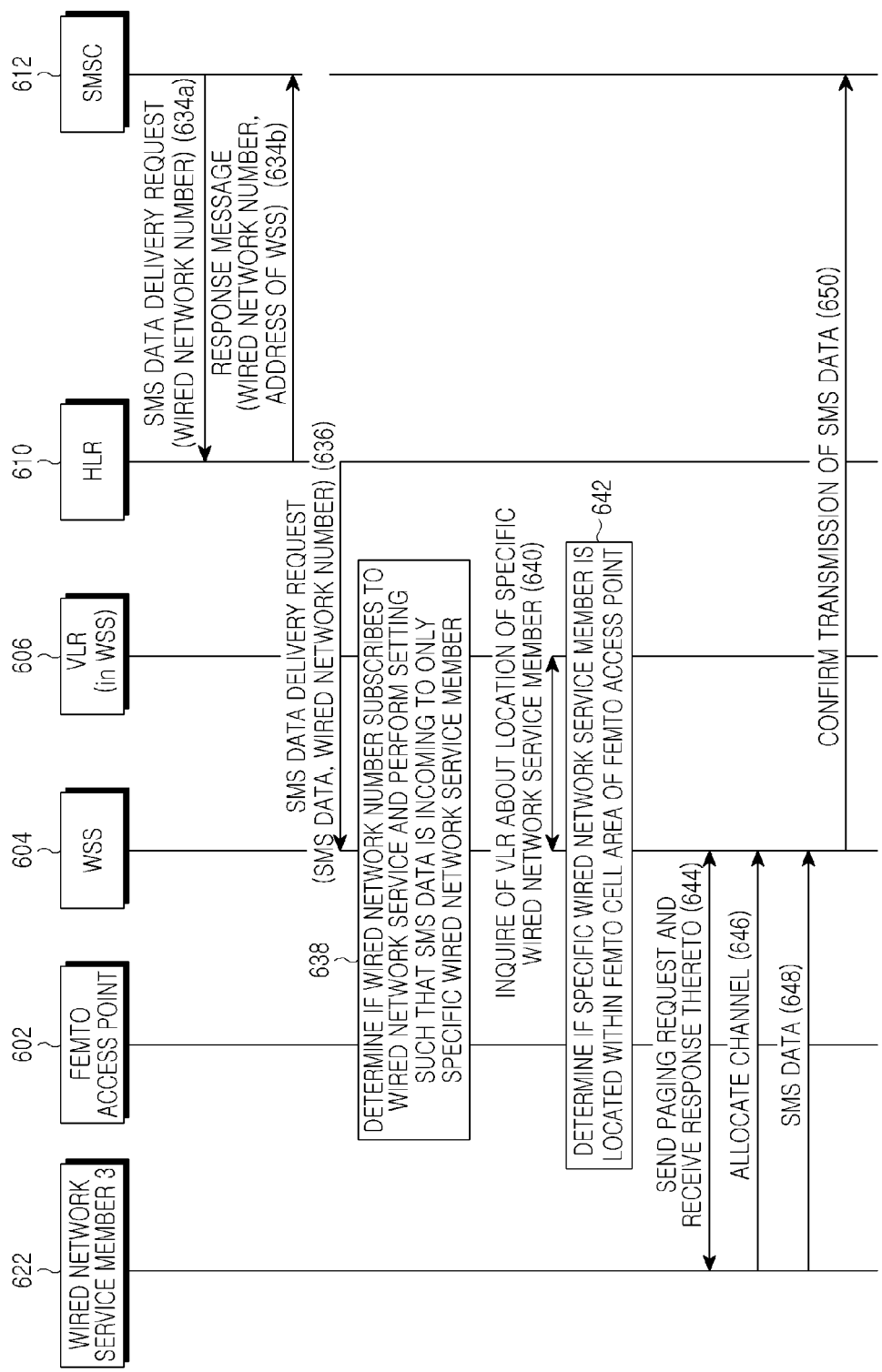
FIG. 6B is a flow diagram illustrating an operation in which SMS data is incoming to only a specific wired network service member in accordance with an exemplary embodiment of the present invention.

FIG. 6B is a flow diagram illustrating an operation in which SMS data is incoming to only a specific wired network service member according to an exemplary embodiment of the present invention.

Referring to FIG. 6*b*, the communication system includes a wired network service member 622, the femto access point 602, the WSS 604, the VLR 606, an HLR 610, and an SMSC 612. Furthermore, it is assumed that the SMSC 612 recognizes the state after the procedure of FIG. 6A is completed, and thus SMS data sent from a calling party is stored in the SMSC 612.

In step 634*a*, the SMSC 612 sends an SMS data delivery request message including a calling party wired network number to the HLR 610. In step 634*b*, the HLR 630 sends a response message to the SMS data delivery request message to the SMSC 612. The response message includes the wired network number and the address of the WSS 604 managing the wired network number.

Upon acquiring the address of the WSS 604, the HLR 610 sends an SMS data delivery request message including the SMS data and the wired network number to the WSS 604 in step 636. In step 638, the WSS 604 determines if the wired network number exists in the wired network service DB. When it is determined that the wired network number exists in the wired network service DB, the WSS 604 confirms that the wired network number is determined in such a manner as to send the SMS data to only a specific wired network service member 612 corresponding to a specific wired network service member indication code, sent from the calling party, among wired network service members mapped to the wired network number, and proceeds to step 640. In step 640, the WSS 604 inquires of the VLR 606 about the location of the specific wired network service member. In step 642, as a result of the inquiry, the WSS 604 confirms that the specific wired network service member 612 is currently located within the service coverage of the femto access point 602. In step 644, the WSS 604 sends a paging request message to the specific wired network service member 612, and receives a response message to the paging request message. Further, the WSS 604 allocates a channel for the SMS data to the specific wired network service member 612 in step 646, and sends the SMS data to the specific wired network service member 612 in step 648. In step 650, the WSS 604 sends an SMS data transmission confirmation message indicating the completion of transmission of the SMS data to the SMSC 612.

Figure 7:
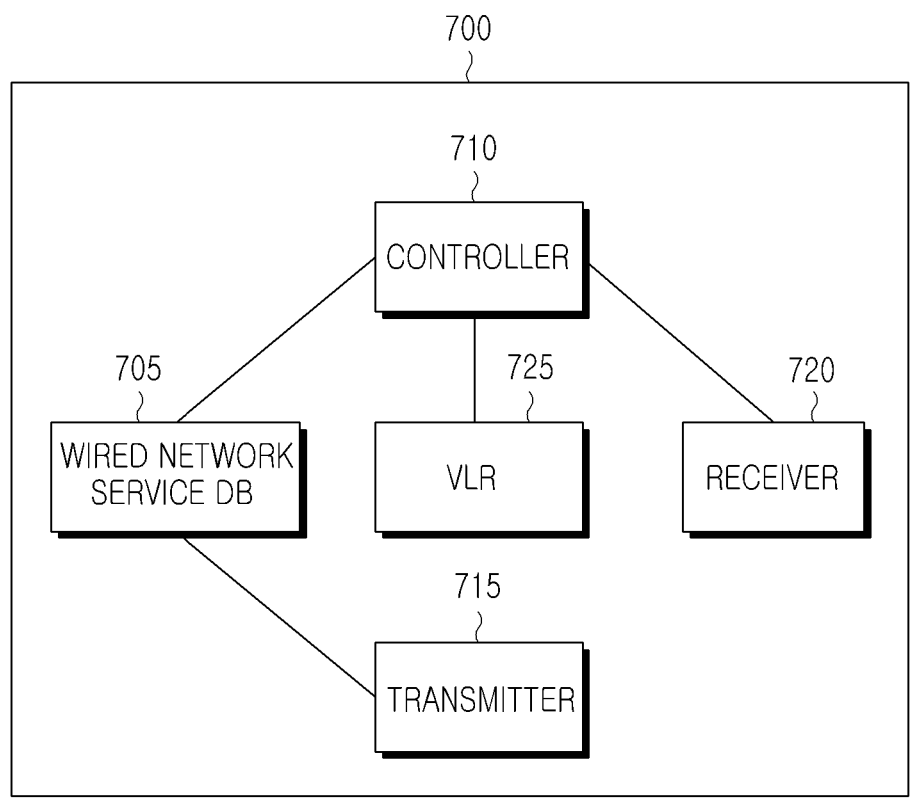
FIG. 7 is a block diagram illustrating a configuration of a Wired Soft Switch (WSS) in accordance with an exemplary embodiment of the present invention.

FIG. 7 is a block diagram illustrating a configuration of a WSS according to an exemplary embodiment of the present invention.

Referring to FIG. 7, the WSS 700 includes a wired network service DataBase (DB) 705, a controller 710, a transmitter 715, a receiver 720, and a VLR 725.

The controller 710 controls the overall operation of the wired network service DB 705, the transmitter 715, the receiver 720, and the VLR 725.

The wired network service DB 705 stores information on whether a corresponding femto access point subscribes to a wired network service, the identifier of the femto access point subscribing to the wired network service, the femto cell identifier of the femto access point, the identifier of the wired network service provided by the femto access point corresponding to the femto cell identifier, a wired network number mapped to the identifier of the wired network service, and wired network service members mapped the wired network number, all of which are mapped to each other according to femto access points managed by the WSS 700.

Under the control of the controller 710, the wired network service DB 705 stores registered terminals as wired network service members of a specific femto access point subscribing to a wired network service when confirming that the registered terminals are located within the femto cell area of the specific femto access point, and maps the wired network service members to a wired network number mapped to the specific femto access point and the identifier of the wired network service provided by the specific femto access point. The controller 710 registers location information of the registered terminals located within the femto cell area of the specific femto access point, that is, the femto cell identifier of the specific femto access point and the wired network number, in an external HLR (not shown) through the transmitter 715. Further, the controller 710 stores the wired network number and femto cell identifiers of non-registered terminals located within the femto cell area of the specific femto access point as location information of the non-registered terminals in the VLR 725. Further, the controller 710 deletes the location information of the non-registered terminals, stored in the VLR 725, when the non-registered terminals depart from the femto cell area where the wired network service to which the non-registered terminals subscribe is provided. Each of the transmitter 715 and the receiver 720 transmits/receives messages for transmission/reception of SMS data or an incoming/outgoing call, which are used in a wired network service, to/from the HLR, the SMSC, and the PSTN. These messages have been already described with reference to FIGS. 2A to 6B, so a detailed description thereof will be omitted here.

Through the operation of the so-configured WSS, when a registered terminal is located within a femto cell area subscribing to a wired network service, the wired network service can be used by means of the registered terminal.

As described above, exemplary embodiments of the present invention propose methods to operate a registered terminal, which is located within a small-sized communication area provided with a femto access point, in the same manner as a non-registered terminal. Therefore, there is no need to have separate terminals according to wired and wireless communication uses, so that resources and costs required to purchase and maintain the separate terminals can be reduced.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A method for providing a communication service for a small-sized communication area in a communication system, the method comprising:
   receiving a first wired network service data generation message including an identification number of a wired network service and a called number of wired network service data from a registered terminal to a mobile network;
   acquiring a femto access point, a wired network number and wired network service members mapped to the identification number of the wired network service from a pre-stored wired network service database; and
   setting the wired network number as a calling number of the registered terminal, and sending a first initial address message including the calling number and the called number to a wired communication network,
   wherein the wired network service represents a communication service that is provided from the wired communication network to at least one registered terminal and at least one non-registered terminal to the mobile network located in the small-sized communication area, and
   wherein a ring signal, which informs the wired network service members of a transmission of the wired network service data, for which calling is requested, is simultaneously sent to the wired network service members.

2. The method of claim 1, wherein the small-sized communication area comprises at least one of an office, a residence, and a building.

3. The method of claim 1, wherein the wired network service database stores information on at least one of whether each femto access point included in the communication system subscribes to the wired network service, a femto cell identifier representing a service coverage of each femto access point subscribing to the wired network service, an identifier of the wired network service provided by the femto access point corresponding to the femto cell identifier, the wired network number mapped to the identifier of the wired network service, wired network service members mapped to the wired network number, and the wired network number used as the called/calling number when the corresponding wired network service data is transmitted/received, and wherein the wired network service members, which are members subscribing to the wired network service, includes at least one registered terminal and at least one non-registered terminal located within the small-sized communication area where the wired network service is provided.

4. The method of claim 3, further comprising:
receiving a second wired network service data generation message for second wired network service data, which includes a non-registered terminal number, from the non-registered terminal;
determining if the non-registered terminal is located within the small-sized communication area where the wired network service is provided, by using location pre-stored information of non-registered terminals;
when the non-registered terminal is located in the small-sized communication area, acquiring the wired network number mapped to the femto cell identifier from the wired network service database; and
setting the acquired wired network number as the calling number of the registered terminal, and sending a second initial address message including the set calling number and the called number of the second wired network service data to the wired communication network.

5. The method of claim 3, further comprising:
receiving a third wired network service data generation message, which includes a request for specifying a destination of third wired network service data, from a first wired network service member; and
performing setting such that the third wired network service data is received by only a wired network service member for which the request for specifying the destination of the third wired network service data, included in the third wired network service data generation message, is made.

6. The method of claim 1, further comprising, when mobile communication service data is received while the registered terminal is located within the small-sized communication area where the wired network service is provided through the wired communication network, performing setting such that the registered terminal receives a ring signal different from a ring signal informing the registered terminal of reception of the wired network service data.

7. A method for providing a communication service for a small-sized communication area in a communication system, the method comprising:
upon receiving an initial message including a called number of wired network service data, for which calling is requested, from a registered terminal through a wired communication network, acquiring location information of a called party that uses the called number;
determining from a pre-stored wired network service database if the location information of the called party indicates a femto cell subscribing to a wired network service provided through the wired communication network;
when the location information of the called party indicates the femto cell subscribing to the wired network service, acquiring wired network service members mapped to an identifier of the femto cell from the wired network service database, and determining locations of the wired network service members;
when a result of the determination shows that the wired network service members are located in the femto cell indicated by the location information of the called party registered terminal, simultaneously sending a ring signal informing the wired network service members of a transmission of the wired network service data, for which calling is requested, to the wired network service members; and
upon receiving a response message from a first wired network service member among the wired network service members, stopping the sending of the ring signal to the wired network service members other than the first wired network service member,
wherein the wired network service represents a communication service that is provided from the wired communication network to at least one registered terminal and at least one non-registered terminal located in the small-sized communication area.

8. The method of claim 7, wherein the small-sized communication area comprises at least one of an office, a residence, and a building.

9. The method of claim 7, wherein the wired network service database stores information on at least one of whether each femto access point included in the communication system subscribes to the wired network service, a femto cell identifier of each femto access point subscribing to the wired network service, an identifier of the wired network service provided by the femto access point corresponding to the femto cell identifier, the wired network number mapped to the identifier of the wired network service, the wired network service members mapped to the wired network number, and the wired network number used as a called/calling number when the corresponding wired network service data is transmitted/received, and wherein the wired network service members, which are members subscribing to the wired network service, includes at least one registered terminal and at least one non-registered terminal located within the small-sized communication area where the wired network service is provided.

10. The method of claim 7, further comprising:
receiving an initial message, which includes the called number set to a wired network number of a specific wired network service member and the wired network service data, from the wired communication network;
identifying a femto access point mapped the wired network number of the specific wired network service member from the pre-stored wired network service database; and
sending the wired network service data to the specific wired network service member through the femto access point.

11. The method of claim 7, further comprising, when mobile communication service data is received while the registered terminal is located within the femto cell area where the wired network service is provided, sending a ring signal different from the ring signal indicative of the wired network service data to the registered terminal.

12. An apparatus for providing a communication service for a small-sized communication area in a communication system, the apparatus comprising:
a receiver for receiving a first wired network service data generation message including an identification number of a wired network service and a called number of wired network service data from a registered terminal to a mobile network;
a controller for acquiring a femto access point, a wired network number and wired network service members mapped to the identification number of the wired network service from a pre-stored wired network service database, and for setting the wired network number as a calling number of the registered terminal; and
a transmitter for sending a first initial address message including the calling number and the called number to a wired communication network,
wherein the wired network service represents a communication service that is provided from the wired communication network to at least one registered terminal and at least one non-registered terminal to the mobile network located in the small-sized communication area, and wherein a ring signal, which informs the wired network service members of a transmission of the wired network service data, for which calling is requested, is simultaneously sent to the wired network service members.

13. The apparatus of claim 12, wherein the small-sized communication area comprises at least one of an office, a residence, and a building.

14. The apparatus of claim 12, wherein the wired network service database stores information on at least one of whether each femto access point included in the communication system subscribes to the wired network service, a femto cell identifier representing a service coverage of each femto access point subscribing to the wired network service, an identifier of the wired network service provided by the femto access point corresponding to the femto cell identifier, the wired network number mapped to the identifier of the wired network service, wired network service members mapped to the wired network number, and the wired network number used as the called/calling number when the corresponding wired network service data is transmitted/received, and wherein the wired network service members, which are members subscribing to the wired network service, includes at least one registered terminal and at least one non-registered terminal located within the small-sized communication area where the wired network service is provided.

15. The apparatus of claim 14, wherein, when the receiver receives a second wired network service data generation message for second wired network service data, which includes a non-registered terminal number, from the non-registered terminal, the controller determines if the non-registered terminal is located within the small-sized communication area where the wired network service is provided, by using location pre-stored information of non-registered terminals, acquires the wired network number mapped to the femto cell identifier from the wired network service database when the non-registered terminal is located in the small-sized communication area, sets the acquired wired network number as the calling number of the registered terminal, and controls the transmitter to send a second initial address message including the set calling number and the called number of the second wired network service data to the wired communication network.

16. The apparatus of claim 14, wherein, when the receiver receives a third wired network service data generation message, which includes a request for specifying a destination of third wired network service data, from a first wired network service member, the controller performs setting such that the third wired network service data is received by only a wired network service member for which the request for specifying the destination of the third wired network service data, included in the third wired network service data generation message, is made.

17. The apparatus of claim 12, wherein, when mobile communication service data is received while the registered terminal is located within the small-sized communication area where the wired network service is provided, the controller performs setting such that the registered terminal receives a ring signal different from a ring signal informing the registered terminal of reception of the wired network service data.

18. An apparatus for providing a communication service for a small-sized communication area in a communication system, the apparatus comprising:

a receiver for receiving an initial message including a called number of wired network service data, for which calling is requested, from a registered terminal through a wired communication network; and a controller for acquiring location information of a called party that uses the called number, for determining from a pre-stored wired network service database if the location information of the called party indicates a femto cell subscribing to a wired network service provided through the wired communication network, for acquiring wired network service members mapped to an identifier of the femto cell from the wired network service database when the location information of the called party indicates the femto cell subscribing to the wired network service, for determining locations of the wired network service members, for controlling a transmitter to simultaneously send a ring signal informing the wired network service members of a transmission of the wired network service data, for which calling is requested, to the wired network service members when a result of the determination shows that the wired network service members are located in the femto cell indicated by the location information of the called party registered terminal, and for stopping the sending of the ring signal to the wired network service members other than a first wired network service member when the receiver receives a response message from the first wired network service member among the wired network service members, wherein the wired network service represents a communication service that is provided from the wired communication network to at least one registered terminal and at least one non-registered terminal located in the small-sized communication area.

19. The apparatus of claim 18, wherein the small-sized communication area comprises at least one of an office, a residence, and a building.

20. The apparatus of claim 18, wherein the wired network service database stores information on at least one of whether each femto access point included in the communication system subscribes to the wired network service, a femto cell identifier of each femto access point subscribing to the wired network service, an identifier of the wired network service provided by the femto access point corresponding to the femto cell identifier, the wired network number mapped to the identifier of the wired network service, the wired network service members mapped to the wired network number, and the wired network number used as a called/calling number when the corresponding wired network service data is transmitted/received, and wherein the wired network service members, which are members subscribing to the wired network service, includes at least one registered terminal and at least one non-registered terminal located within the small-sized communication area where the wired network service is provided.

21. The apparatus of claim 18, wherein, when the receiver receives an initial message, which includes the called number set to a wired network number of a specific wired network service member and the wired network service data, from the wired communication network, the controller identifies a femto access point mapped to the wired network number of the specific wired network service member from the pre-stored wired network service database, and controls the transmitter to send the wired network service data to the specific wired network service member through the femto access point.

22. The apparatus of claim 18, wherein, when mobile communication service data is received while the registered terminal is located within the femto cell area where the wired network service is provided, the controller controls the transmitter to send a ring signal different from the ring signal indicative of the wired network service data to the registered terminal.

* * * * *